United States Patent
Brown et al.

(10) Patent No.: US 10,261,868 B2
(45) Date of Patent: Apr. 16, 2019

(54) USING A FORWARD LOG STORAGE AND BACKWARD LOG STORAGE TO RECOVER A STORAGE TO A FORWARD OR BACKWARD POINT-IN-TIME

(71) Applicant: International Business Machines Corporation, Armonk, NY (US)

(72) Inventors: Theresa M. Brown, Tucson, AZ (US); Nicolas M. Clayton, Cheshire (GB); Gregory E. McBride, Vail, AZ (US); Carol S. Mellgren, Tucson, AZ (US); David C. Reed, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 15/354,949

(22) Filed: Nov. 17, 2016

(65) Prior Publication Data
US 2018/0137016 A1  May 17, 2018

(51) Int. Cl.
*G06F 11/14* (2006.01)
(52) U.S. Cl.
CPC ...... *G06F 11/1469* (2013.01); *G06F 11/1448* (2013.01); *G06F 2201/84* (2013.01)
(58) Field of Classification Search
CPC .............................. G06F 11/14; G06F 11/1469
USPC .......................................................... 714/15
See application file for complete search history.

(56) References Cited

U.S. PATENT DOCUMENTS

| 6,594,744 | B1 | 7/2003 | Humlicek et al. |
| 6,983,295 | B1 * | 1/2006 | Hart .................... G06F 11/1469 |
| | | | 707/610 |
| 7,206,961 | B1 * | 4/2007 | Mutalik .............. G06F 11/1469 |
| | | | 707/999.202 |
| 7,284,104 | B1 | 10/2007 | Wu et al. |
| 7,383,465 | B1 | 6/2008 | van Rietschote et al. |

(Continued)

OTHER PUBLICATIONS

US Patent Application, dated Nov. 17, 2016 for U.S. Appl. No. 15/354,952, filed Nov. 17, 2016, invented by Theresa Brown et al., Total 34 pages.

(Continued)

*Primary Examiner* — Kamini B Patel
(74) *Attorney, Agent, or Firm* — David W. Victor; Konrad, Raynes, Davda and Victor LLP

(57) ABSTRACT

Provided are a computer program product, system, and method for using a forward log storage and backward log storage to recover a storage to a forward or backward point-in-time. In response to receiving writes to source data after establishing point-in-time copies, point-in-time data of the source data is copied to a backward log storage storing point-in-time data for multiple of the point-in-time copies. The point-in-time data in the backward log storage is applied to a recovery source data to roll-back the source data to a backward point-in-time of one of the point-in-time copies. Before applying the point-in-time data from the backward log storage, point-in-time data in the recovery source data, is copied to a forward log storage. The point-in-time data in the forward log storage is applied to the recovery source data to roll forward the recovery source data to a forward point-in-time subsequent to the backward point-in-time.

24 Claims, 10 Drawing Sheets

(56) References Cited

U.S. PATENT DOCUMENTS

| | | | |
|---|---|---|---|
| 7,594,137 B2 * | 9/2009 | Kawaguchi | G06F 11/1458 714/6.3 |
| 7,620,785 B1 * | 11/2009 | Coulter | G06F 11/1471 711/161 |
| 7,739,464 B1 * | 6/2010 | Coulter | G06F 11/1466 711/162 |
| 8,041,911 B2 | 10/2011 | Matsui | |
| 8,051,425 B2 * | 11/2011 | Godman | G06F 9/5038 709/219 |
| 8,555,010 B2 | 10/2013 | Yuhara et al. | |
| 8,600,952 B2 | 12/2013 | Blitzer et al. | |
| 8,732,479 B1 * | 5/2014 | Henriksen | G06F 11/1464 709/201 |
| 8,909,604 B1 | 12/2014 | Holenstein et al. | |
| 9,128,901 B1 * | 9/2015 | Nickurak | G06F 11/2094 |
| 9,646,042 B2 * | 5/2017 | Bengali | G06F 17/30371 |
| 9,747,047 B2 * | 8/2017 | Brown | G06F 3/0619 |
| 2007/0271431 A1 * | 11/2007 | Hwang | G06F 11/1471 711/162 |
| 2009/0125692 A1 | 5/2009 | Yamamoto et al. | |
| 2014/0229423 A1 * | 8/2014 | Bengali | G06F 17/30563 707/602 |
| 2015/0227432 A1 | 8/2015 | Jaquette et al. | |
| 2015/0227575 A1 * | 8/2015 | Jaquette | G06F 17/3007 707/645 |
| 2015/0286542 A1 | 10/2015 | Dain et al. | |
| 2015/0301906 A1 | 10/2015 | Crockett et al. | |
| 2015/0310080 A1 * | 10/2015 | Jaquette | G06F 17/30575 707/639 |
| 2015/0378832 A1 * | 12/2015 | Brown | G06F 11/1451 714/19 |
| 2016/0117227 A1 | 4/2016 | Hetrick et al. | |
| 2016/0202925 A1 | 7/2016 | Dain et al. | |
| 2018/0137017 A1 | 5/2018 | Brown et al. | |

OTHER PUBLICATIONS

Lists of Related Applications, pp. 2, dated Nov. 17, 2016.
Office Action dated Jun. 20, 2018, pp. 22, for U.S. Appl. No. 15/354,952, filed Nov. 17, 2016.
Response to Office Action, dated Sep. 20, 2018, pp. 15, for U.S. Appl. No. 15/354,952, filed Nov. 17, 2016.
Final Office Action dated 2018-12-27, pp. 22, for U.S. Appl. No. 15/354,952, filed 2016-11-17, TUC920160134US1 (18.673.

* cited by examiner

Point-in-Time Copy Information

Backward or Forward Log Entry

Backward or Forward Recovery Metadata Entry

USING A FORWARD LOG STORAGE AND BACKWARD LOG STORAGE TO RECOVER A STORAGE TO A FORWARD OR BACKWARD POINT-IN-TIME

BACKGROUND OF THE INVENTION

1. Field of the Invention

The present invention relates to a computer program product, system, and method for using a forward log storage and backward log storage to recover a storage to a forward or backward point-in-time.

2. Description of the Related Art

In a storage environment, a storage controller may create point-in-time ("PiT") copies of a production volume using point-in-time copy techniques, such as the IBM Flash-Copy® (FlashCopy is a registered trademark of IBM), snapshot, etc. A point-in-time copy replicates data in a manner that appears instantaneous and allows a host to continue accessing the source volume while actual data transfers to the copy volume are deferred to a later time. The point-in-time copy appears instantaneous because complete is returned to the copy operation in response to generating the relationship data structures without copying the data from the source to the target volumes. Point-in-time copy techniques typically defer the transfer of the data in the source volume at the time the point-in-time copy relationship was established to the copy target volume until a write operation is requested to that data block on the source volume. Data transfers may also proceed as a background copy process with minimal impact on system performance. The point-in-time copy relationships that are immediately established in response to the point-in-time copy command include a bitmap or other data structure indicating the location of blocks in the volume at either the source volume or the copy volume. The point-in-time copy comprises the combination of the data in the source volume and the data to be overwritten by the updates transferred to the target volume.

When an update to a block in the source volume involved in a point-in-time copy relationship is received, the copy of the track as of the point-in-time must be copied to a side file or the target volume before the new data for the track is written to the source volume, overwriting the point-in-time copy of the data.

If the data in the source volume becomes corrupted or invalid, that corruption is also mirrored to the mirror copy, which may comprise a point-in-time copy, such that both versions of the data have been corrupted at this point. The point-in-time copies may be used as recovery points to try to recover the source volume to a point where the data has no corruption. However, it can be cost prohibitive to maintain numerous point-in-time copies to allow recovery to a closest point-in-time where there was valid data prior to being corrupted.

SUMMARY

Provided are a computer program product, system, and method for using a forward log storage and backward log storage to recover a storage to a forward or backward point-in-time. A plurality of point-in-time copies of source data in a source storage at different point-in-times are established. In response to receiving writes to the source data after establishing the point-in-time copies, point-in-time data of the source data is copied, before being updated by the received writes, to a backward log storage, wherein the backward log storage stores point-in-time data for multiple of the point-in-time copies. The point-in-time data in the backward log storage is applied to a recovery source data to roll-back the source data to a backward point-in-time of one of the point-in-time copies. Before applying the point-in-time data from the backward log storage, point-in-time data in the recovery source data, to be updated by the point-in-time data from the backward log storage, is copied to a forward log storage. The point-in-time data in the forward log storage is applied to the recovery source data to roll forward the recovery source data to a forward point-in-time subsequent to the backward point-in-time.

DETAILED DESCRIPTION

Described embodiments provide techniques for maintaining information on point-in-time data for different point-in-time copies of source data, such as volumes, that may be used to roll-back and roll-forward the source volume to a backward and forward point-in-time of a point-in-time copy. The described embodiments may be used to form recovery source data, or recovery volumes, comprising the source data as of a previous point-in-time of one of the point-in-time copies that has valid data in the event the source volume has corrupted or invalid data. After rolling back the recovery volume to a backward point-in-time, the recovery source may be rolled forward to a forward point in time. The rolling-back and rolling-forward operations may be performed to find recovery source data having valid data as of a most current point-in-time at which there is valid data.

In described embodiments, point-in-time data from source data for an active point-in-time copy is copied to a backward log storage, which stores point-in-time data for multiple of the point-in-time copies when they are active. The backward log storage may be used to roll-back the source data to a selected backward point-in-time of one of the point-in-time copies. Before rolling-back source data, the point-in-time data for the source data may be stored in a forward log storage to use to roll forward the source data after rolling-back the source data.

Figure 1:
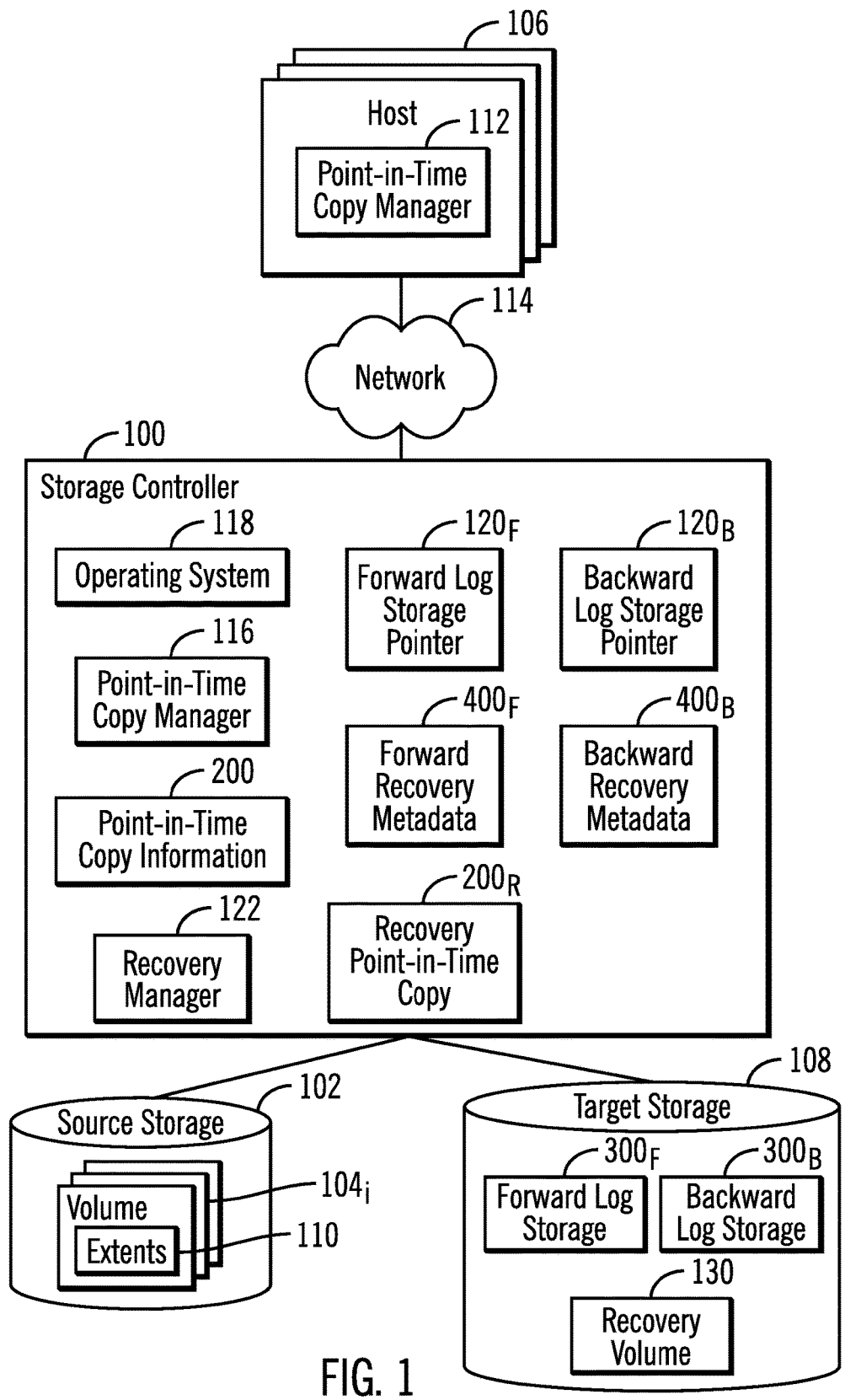
FIG. 1 illustrates an embodiment of a storage environment.

FIG. 1 illustrates an embodiment of a data storage environment having a storage controller 100 managing access to a source storage 102 that includes source volumes $104_i$, such as a production volume used by different host systems 106, and a target storage 108. The volumes $104_i$ are comprised of extents 110 of contiguous tracks. A host system 106 includes a point-in-time copy manager program 112 to establish point-in-time copies at the storage controller 100, such as FlashCopy, snapshot, etc. The storage controller 100 and hosts 106 may communicate over a network 114.

The storage controller 100 includes a point-in-time copy manager 116 to create point-in-time copies of data in the source storage 102, e.g., FlashCopy, snapshot, etc. When creating a point-in-time copy, the point-in-time copy manager 116 generates point-in-time copy information 200 on the point-in-time copy created as of a point-in-time. The storage controller 100 further includes an operating system 118, including the code and logic to manage Input/Output ("I/O") requests to the source storage 102. The operating system 118 may configure the source storage 102 and target storage 108 in one or more volumes $104_i$ and data, such as tracks or logical block addresses (LBAs), grouped in extents. Extents 110 may comprise any grouping of tracks or data units in storage. The point-in-time copy manager 116 may be a copy service supplied with the operating system 118.

When a data location, such as a track, in a source storage, e.g., volume, in an active point-in-time copy relationship identified in the point-in-time copy information 200 is subject to a write request, the point-in-time copy manager 116 copies the current data at the track, referred to as the point-in-time data, to a backward log storage $300_B$ in the target storage 108. Only after copying the point-in-time data to the backward log storage $300_B$ may the write data be applied to the source storage 102 location, so that the log storage preserves the point-in-time data for that source data location. The point-in-time copy manager 116 may maintain a backward log storage pointer $120_B$ that addresses a next location in the backward log storage $300_B$ at which to write point-in-time data about to be updated. In certain embodiments, the backward log storage $300_B$ may sequentially store point-in-time data across multiple point-in-time copy 200 relationships.

A recovery manager 122 may perform a recovery operation to roll-back the data in the source data to a point-in-time of one of the point-in-time copies 200. The recovery manager 122 may use backward recovery metadata $400_B$ that provides information on point-in-time data in the backward log storage $300_B$ for point-in-time copies 200 to roll-back the source. The recovery manager 122 may generate a recovery point-in-time copy $200_R$ to reconstruct data from the backward log storage $300_B$ for a point-in-time at which to restore or roll-back the source volume. The recovery manager 122 may store point-in-time data for a recovery point-in-time copy $200_R$ in a recovery volume 130, also referred to as recovery source data, recovery source storage, in the target storage 108, separate from the backward log storage $300_B$.

Before rolling-back data in the recovery volume 130 using the backward log storage $300_B$, the recovery manager 122 may store the current point-in-time data in the recovery volume 130 to a forward log storage $300_F$. The recovery manager 122 may use forward recovery metadata $400_F$ that provides information on point-in-time data in the forward log storage $300_F$ for point-in-time copies 200 to roll-forward data in the recovery volume 130 to a forward point-in-time, to roll-forward and reverse the changes made by the roll-back operations. Multiple iterations of intermixed roll-forward and roll-back operations may be performed on the recovery volume 130 to reach a desired point-in-time.

The recovery manager 122 may maintain a forward log storage pointer $120_F$ that addresses a next location in the forward log storage $300_F$ at which to write point-in-time data about to be updated during a roll-back operation. In certain embodiments, the forward log storage $300_F$ may sequentially store point-in-time data across multiple point-in-time copy 200 relationships.

The storages 102 and 108 may comprise different types or classes of storage devices, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. The volumes 104 an log storage 300 may further be configured from an array of devices, such as Just a Bunch of Disks (JBOD), Direct Access Storage Device (DASD), Redundant Array of Independent Disks (RAID) array, virtualization device, etc. Further, the storages 102 and 108 may comprise heterogeneous storage devices from different vendors and different types of storage devices, such as a first type of storage devices, e.g., hard disk drives, that have a slower data transfer rate than a second type of storage devices, e.g., SSDs.

The network 114 may comprise a network such as one or more interconnected Local Area Networks (LAN), Storage Area Networks (SAN), Wide Area Network (WAN), peer-to-peer network, wireless network, etc.

The point-in-time copy manager 116 performs a point-in-time copy operation that creates a copy of specified extents in a manner that appears instantaneous and allows a process to continue accessing the extents subject to the point-in-time copy while actual data transfers of the copied data are deferred to a later time. The point-in-time copy appears instantaneous because complete is returned to the copy operation in response to generating the relationship data structures, such as the point-in-time copy information 200 and change recording information, without copying the data.

In FIG. 1, the point-in-time copy managers 112, 116 and recovery manager 122 are shown as implemented in separate computing systems, a host 106 and storage controller 100. In alternative embodiments, the point-in-time copy managers 112, 116 and recovery manager 122 may be implemented on a same computer system and operating system. Still further, the point-in-time copy managers 112, 116 and recovery manager 122 may be modules within a single deployed computer program installed on a single computer system/operating system.

Figure 2:
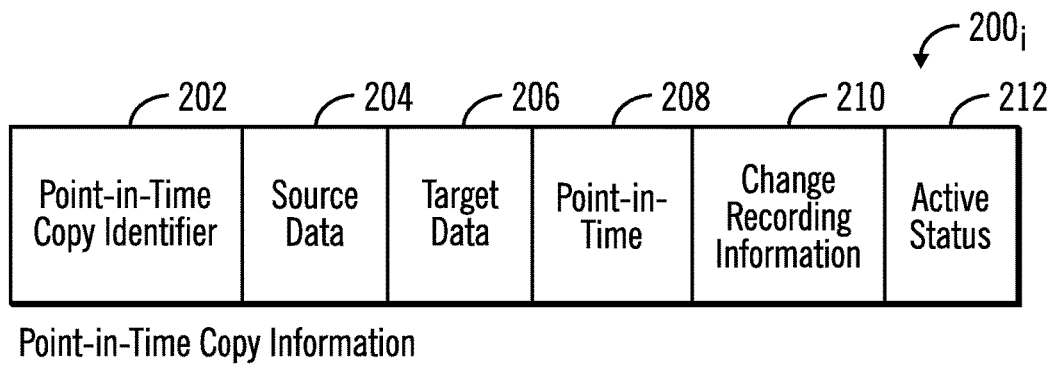
FIG. 2 illustrates an embodiment of point-in-time copy information.

FIG. 2 illustrates an instance of the point-in-time copy information $200_i$, also referred to as a point-in-time copy, and may include: a point-in-time copy identifier 202 providing a unique identifier of a point-in-time copy; source data 204, indicating a division of source storage 102 subject to a point-in-time copy operation, such as a volume $104_i$, data set, range of extents, etc.; target data 206 indicating where the point-in-time data is copied, which may comprise the backward log storage $300_B$, a recovery volume 130, volume or other division in the target storage 108; a point-in-time 208 of the point-in-time copy 202, such that source data 204 for the point-in-time copy $200_i$ is consistent as of that point-in-time 208; change recording information 210 indicating which data or tracks in the source data 204 has changed since the point-in-time 208, which may comprise a bitmap having a bit for each data unit (e.g., track) that is set to one of two values indicating the data or track represented by the bit has or has not been updated since the point-in-time 208; and an active status 212 indicating whether the point-in-time copy 202 is active and still recording changes made to the source data 204. The point-in-time copy managers 112, 116 may generate numerous point-in-time copies $200_i$ for the source data 204 at different points-in-time, such as at scheduled time intervals.

Figure 3:
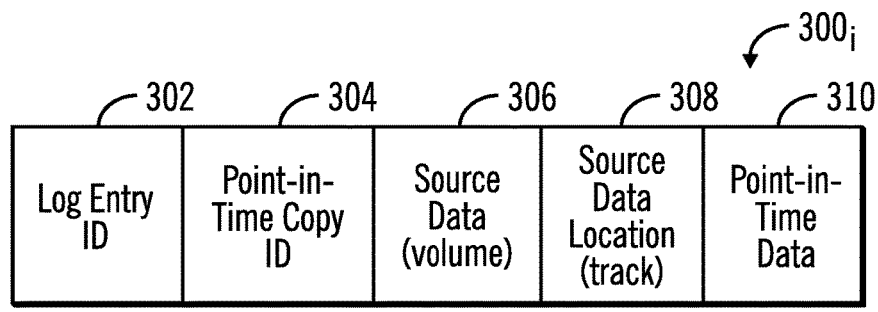
FIG. 3 illustrates an embodiment of a backward or forward log entry in log storage.

FIG. 3 illustrates an instance of a log entry $300_i$ in the forward log storage $300_F$ and the backward log storage $300_B$ for point-in-time data copied from the source data 204 for one of a plurality of point-in-time copies of the source data 204, and may include: a log entry identifier (ID) 302 providing a unique identifier of the entry in the backward $300_B$ or forward $300_F$ log storage; a point-in-time copy identifier 302 of the point-in-time copy $200_i$ for which the point-in-time data is intended, which comprises the point-in-time copy ID 202; source data 306, e.g., volume $104_i$, and source data location 308, e.g., track in the volume 306, from which the point-in-time data was copied; and the point-in-time data 310. In this way, the log entry $300_i$ includes metadata on the point-in-time data as well as the actual data 310. Alternatively, a pointer to the point-in-time data may be included.

In described embodiments, the backward $300_B$ and forward $300_F$ log storages sequentially store point-in-time data from multiple point-in-time copies to optimize the storage of the point-in-time data by consolidating in a log storage location the data from multiple point-in-time copies. Further, consolidating point-in-time data in the log storages $300_B$, $300_F$ reduces wasted space and allows for the storage of many more point-in-time copies than would be possible if a separate volume was required to store the point-in-time data for the point-in-time copies.

Figure 4:
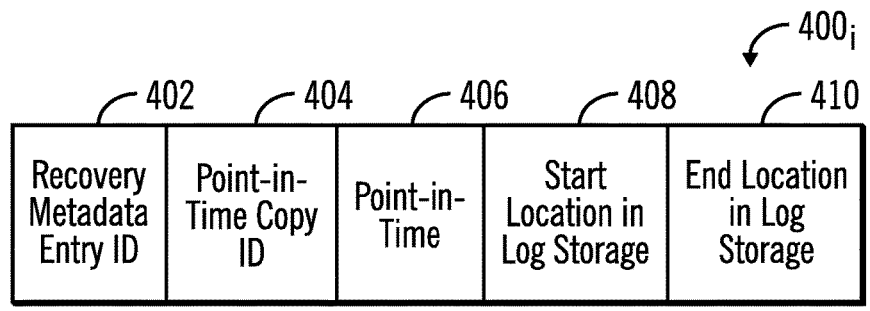
FIG. 4 illustrates an embodiment of an entry in recovery metadata.

FIG. 4 illustrates an embodiment of an instance of a recovery metadata entry $400_i$ in the backward $400_B$ and forward $400_F$ recovery metadata 400 added for a point-in-time copy for use by the recovery manager 122, and includes: an entry ID 402 providing a unique identifier of the entry in the recovery metadata 400; a point-in-time copy ID 404 of the point-in-time copy for which the recovery metadata 402 is provided; a point-in-time 406 of the point-in-time copy 404; a start location in the log storage 408 at which point-in-time data for the point-in-time copy 404 is written sequentially; and an end location in the log storage 410 of the last written point-in-time data for the point-in-time copy 404. In certain embodiments, all the point-in-time data (log entries $300_i$) for a point-in-time copy 404 are written sequentially from the start location 408 through the end location 410. In this way, the recovery metadata entry $400_i$ for each point-in-time copy identifies where in the log storage 300 the log entries $300_i$ of point-in-time data for the point-in-time copy 404 are stored.

Figure 5:
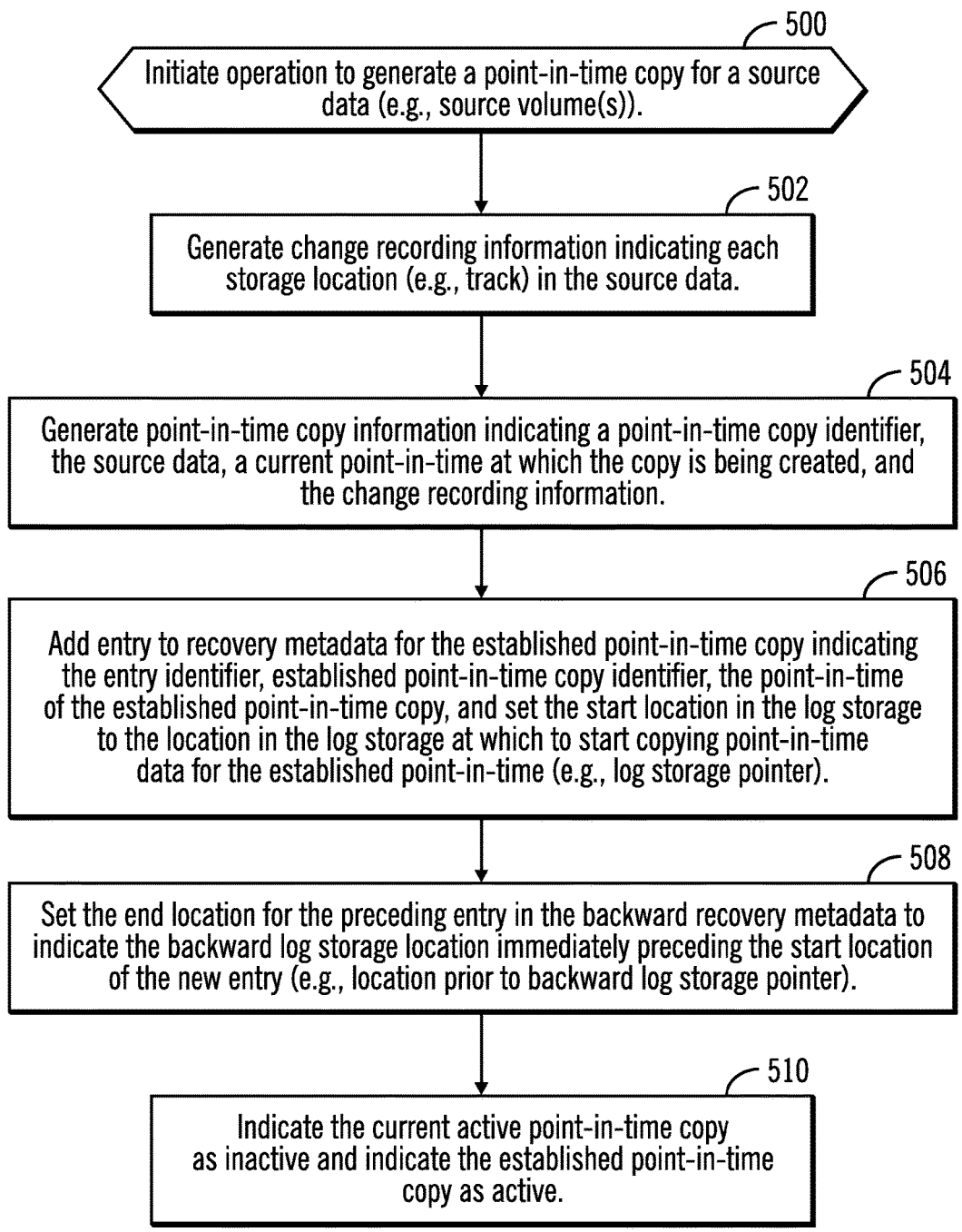
FIG. 5 illustrates an embodiment of operations to generate a point-in-time copy of a source data.

FIG. 5 illustrates an embodiment of operations performed by the storage controller point-in-time copy manager 116 to generate a point-in-time copy $200_i$ for a source storage 102, such as one or more volumes $104_i$. The point-in-time copy manager 116 may perform the operations of FIG. 5 in response to a command from the host point-in-time copy manager 112, automatically according to a schedule, or activated by some other means. Upon initiating (at block 500) an operation to generate a point-in-time copy $200_i$ for indicated source data, e.g., volume $104_i$, the point-in-time copy manager 116 generates (at block 502) change recording information 210 indicating the tracks in the specified source data to copy. The point-in-time copy manager 116 generates (at block 504) point-in-time copy information $200_i$ indicating the point-in-time copy identifier 202, the source data 204, e.g., volume, subject to the copy, a current point-in-time 208 at which the copy is being created, and the generated change recording information 210.

The point-in-time copy manager 116 adds (at block 506) an entry $400_i$ to the backward recovery metadata $400_B$ for the established point-in-copy $200_i$ time indicating an identifier 402 for the added entry $400_i$, the point-in-time copy identifier 202 of the established point-in-time copy $200_i$ in field 404, the point-in-time 208 of the point-in-time copy $200_i$ in field 406; and set the start log location 408 to the next location in the log storage at which to start copying point-in-time data for the established point-in-time copy 202, which may comprise the location addressed by the backward log storage pointer $120_B$. The end location 410 in the entry $400_{i-1}$ preceding the entry being added $400_i$, i.e., for the immediately preceding point-in-time copy $200_{i-1}$, may be set (at block 508) to indicate the log storage location immediately preceding the start location 408 of the new entry $400_i$ (e.g., location prior to that addressed by the backward log storage pointer $120_B$). In an alternative embodiment, the end location 410 may be updated whenever a new log entry $300_i$ is added to the log storage 300. The current active point-in-time copy $200_{i-1}$ is indicated (at block 510) as inactive in status field 212 to inactivate the current active point-in-time copy $200_{i-1}$, and the just created point-in-time copy $200_i$ is indicated as active in status field 212 of the newly created point-in-time copy $200_i$.

With the operations of FIG. 5, when establishing a new point-in-time copy $200_i$, an entry is also added to the backward recovery metadata $400_B$ that provides information on the point-in-time data in the backward log storage $300_B$ for a point-in-time copy $200_i$ that may be used during roll-back operations on the source data. Further, the backward recovery metadata $400_B$ entries are in order in which the point-in-time copies $200_i$ identified by the entries $400_i$ are added. This allows the backward recovery metadata $400_B$ to determine the ordering of the point-in-time copies according to their points-in-time that may be selected to roll-back the source storage 102 volumes $104_i$ to the point-in-time of one of the point-in-time copies 200.

Figure 6:
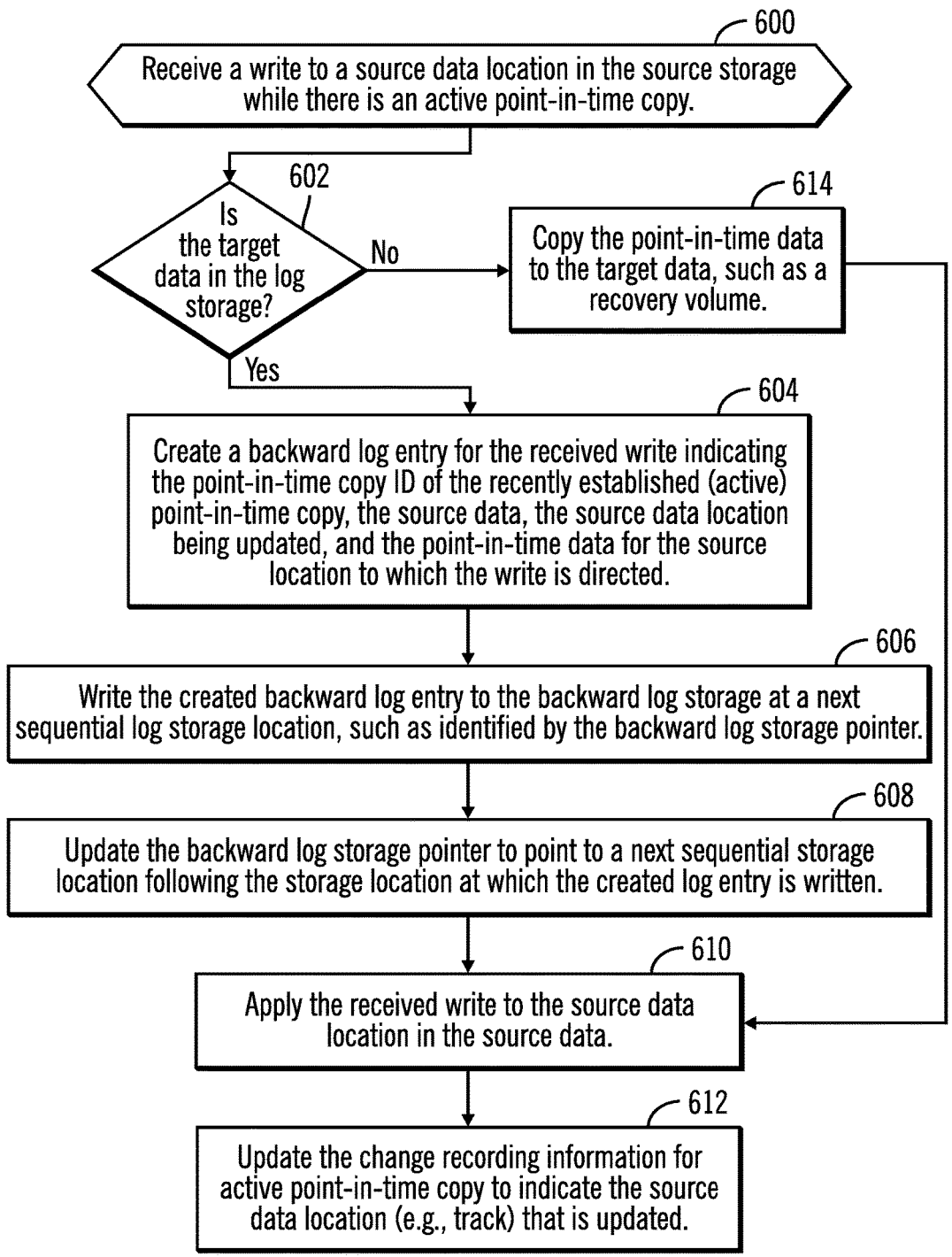
FIG. 6 illustrates an embodiment of operations to process a write to the source data while there is an active point-in-time copy.

FIG. 6 illustrates an embodiment of operations performed by the operating system 118, and/or another component such as the point-in-time copy manager 116, to handle a write request to the source storage 102 while there is an active point-in-time copy $200_i$. Upon receiving (a block 600) a write from a host 106 to one of the tracks in an extent 110 to update data, the operating system 118 determines (at block 602) whether the target data 206 for the active point-in-time copy $200_i$ is a log storage 300, a recovery volume 130 or other target volume or data division. If (at block 602) the target data 206 is the log storage 300, then the operating system 118 creates (at block 604) a backward log entry $300_i$ for the received write indicating an identifier 302 of the created entry the point-in-time copy ID 304 of the active point-in-time copy $200_i$, the source data 306, e.g., volume, the source data location 308, e.g., track, that is being updated in the source data 306, and the point-in-time data 310 for the source location to which the write is directed. The created log entry $300_i$ is written (at block 606) to the backward log storage $300_B$ at a next sequential log storage location, such as identified by the backward log storage pointer $120_B$. The operating system 118 updates (at block 608) the backward log storage pointer $120_B$ to point to a next sequential storage location following the storage location at which the created log entry $300_i$ is written. The received write is then applied (at block 610) to the source data location 308 in the source data 306, as the point-in-time data has been copied to the log storage 300 in a separate target storage 108. The change recording information 210 for the point-in-time copy is updated (at block 612) to indicate that the source data location (e.g., track) is updated.

If (at block 602) the target storage 206 of the active point-in-time copy $200_i$ is not a log storage 300, such as is a recovery volume 130 when the active point-in-time copy comprises the recovery point-in-time copy $200_R$, then the operating system 118 copies (at block 614) the point-in-time data to be overwritten from the source data 204 to the identified target data 206, e.g., recovery volume 130. Control then proceeds to block 610 to complete the write.

Figure 7A:
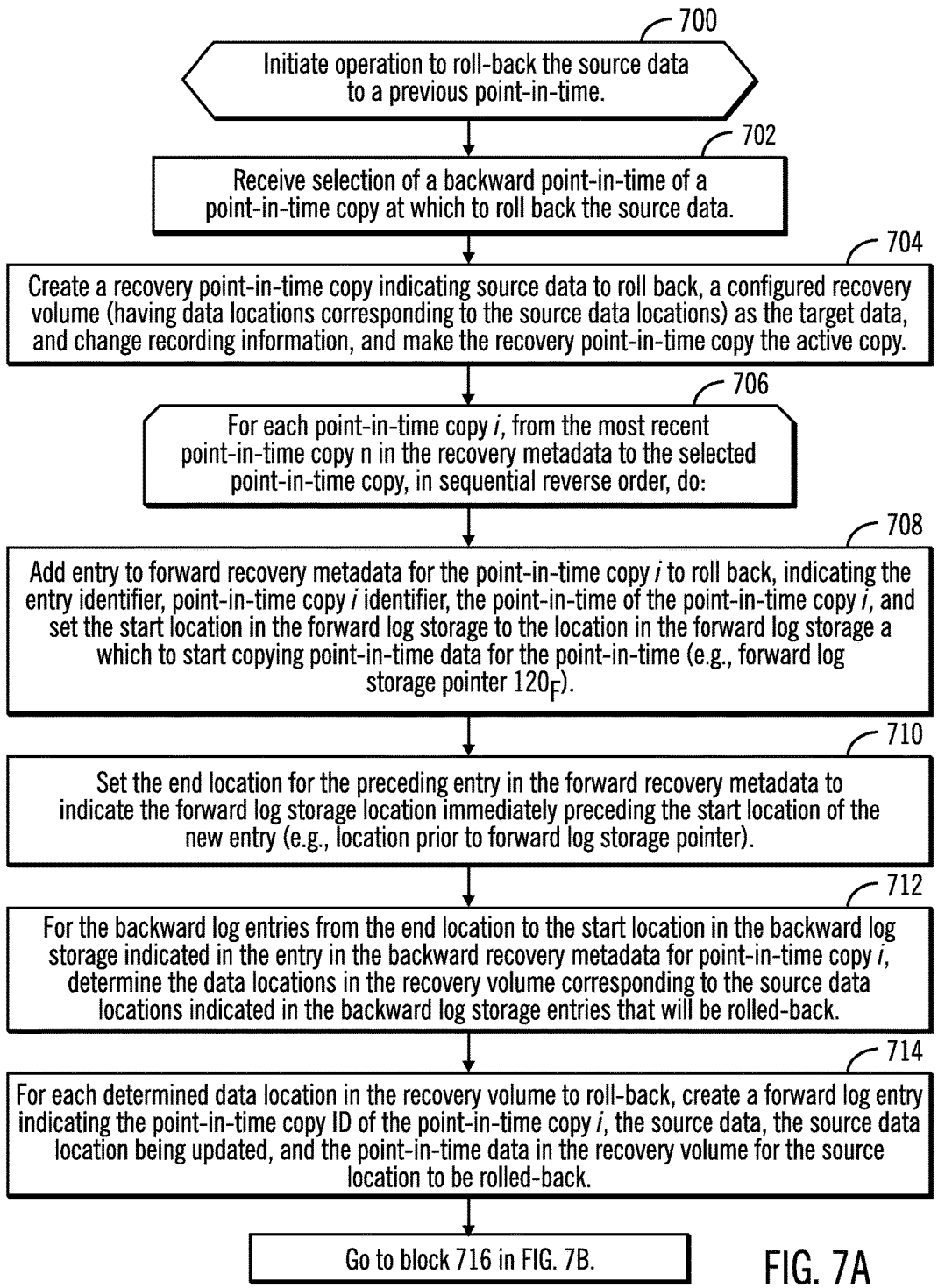
FIGS. 7a and 7b illustrate an embodiment of operations to roll-back the source data to a backward point-in-time.
Figure 7B:
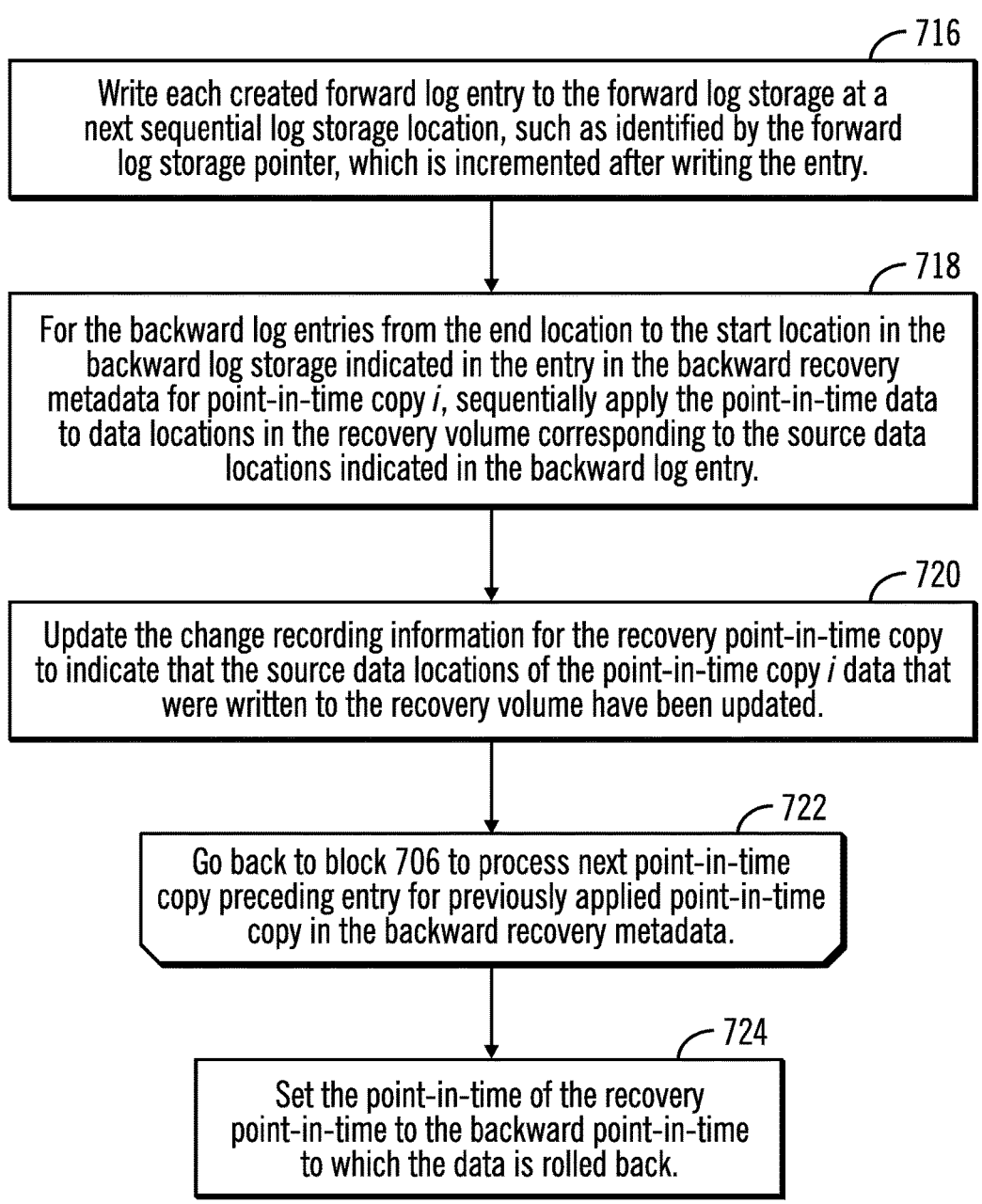

FIGS. 7a and 7b illustrate an embodiment of operations performed by the recovery manager 122 to restore the source data, such as a volume $104_i$, to a point-in-time of a point-in-time copy $200_i$. Upon initiating (at block 700) an operation to roll-back the source data 204 to a previous point-in-time, the recovery manager 122 receives (at block 702) selection of a backward point-in-time of one of a selected point-in-time copies $200_S$, less than the current point-in-time. The recovery manager 122 creates (at block 704) a recovery point-in-time copy $200_R$ indicating the source data 204 to be rolled-back, a configured recovery volume as the target data 206 (having data locations corresponding to the source data 204 locations), change recording information 210 indicating locations in the source data 204 to recover, and having the active status 212 to indicate that the recovery point-in-time copy $200_R$ is active. A loop of operations is performed at block 706 through 722 for each point-in-time copy $200_i$ from the most recent point-in-time copy $200_N$ indicated in the last entry $400_N$ in the recovery metadata 400 through the selected backward point-in-time copy $200_S$.

An entry $400_i$ is added (at block 702) to the forward recovery metadata $400_F$ for the point-in-time copy $200_i$ to roll back, indicating the entry identifier 402, point-in-time copy $200_i$ 404 identifier, the point-in-time 406 of the point-in-time copy $200_i$, and set the start location 408 in the forward log storage $300_F$ to the location in the forward log storage $300_F$ at which to start copying point-in-time data for the point-in-time (e.g., log storage pointer). The end location 410 for the preceding entry $400_{i-1}$ in the forward recovery metadata $400_F$ is set (at bock 710) to indicate the forward log storage location immediately preceding the start location 408 of the new entry $400_i$ (e.g., location prior to forward log storage pointer $120_F$).

For the backward log entries $300_i$ from the end location 410 to the start location 408 in the backward log storage indicated in the entry $400_i$ in the backward recovery metadata $400_B$ for point-in-time copy $200_i$, determine the data locations in the recovery volume 130, e.g., tracks, logical block addresses, etc., corresponding to the source data locations indicated in the backward log storage entries $300_i$ that will be rolled-back. For each determined data location in the recovery volume 130 to roll-back, create a forward log entry $300_i$ indicating the point-in-time copy ID 304 of the point-in-time copy $200_i$, the source data 306, the source data location 308 being updated, and the point-in-time data 310 in the recovery volume 130 for the source data location to be rolled-back before being rolled back.

Control proceeds to block 716 in FIG. 7b to write each created forward log entry $300_i$ to the forward log storage $300_F$ at a next sequential log storage location, such as identified by the forward log storage pointer $120_F$, which is incremented after writing the entry $300_i$. For the backward log entries $300_i$ from the end location 410 to the start location 408 in the backward log storage $300_B$ indicated in the entry $400_i$ in the backward recovery metadata $400_B$ for the point-in-time copy $200_i$ being processed, the recovery manager 122 sequentially applies (at block 718) the point-in-time data from the backward log entries $300_i$ to the data locations in the recovery volume 130 corresponding to the source data locations 308, indicated in the backward log entries $300_i$, to roll-back the recovery volume 130. The change recording information 210 for the recovery point-in-time copy $200_R$ is updated (at block 720) to indicate that the data locations of the recovery point-in-time copy $200_R$, that were written to the recovery volume 130, have been updated. After building the recovery volume 130, for the recovery point-in-time copy $200_R$, with the point-in-time data as of the selected backward point-in-time to restore, the recovery manager 122 sets (at block 724) the point-in-time 208 of the recovery point-in-time $200_R$ to the backward point-in-time to which the data is rolled back.

With the operations of FIGS. 7a and 7b, the forward log storage $300_F$ is created while rolling-back the recovery volume 130 so that the data overwritten in the recovery volume 130 as part of a roll-back operation is saved in the forward log storage $300_F$ to later undo the changes of the roll back to roll forward the rolled-back recovery volume 130. Further, the change recording information 210 for the recovery point-in-time copy $200_R$ is updated to indicate that the point-in-time data for source data locations written from the log storage 300 to the recovery volume 130 have been updated. This would prevent the operating system 118 from copying point-in-time data to be updated from the source data in the source storage 102 to the recovery volume 130 to overwrite data copied from the forward $300_F$ and backward $300_B$ log storage because the change recording information 210 indicates the point-in-time data has already been applied as a result of the copying of the point-in-time data from the log storages $300_B$, $300_F$. This ensures that the point-in-time data from the forward $300_F$ and backward $300_B$ log storages written to the recovery volume 130 is not overwritten by point-in-time data at the source storage 102 that is subsequently updated. Further, with the operations of FIGS. 7a and 7b, all of the point-in-time data as of the restore point-in-time is staged in the recovery volume 130 before being applied to the source data 204 of the recovery point-in-time copy $200_R$. Once the point-in-time data in the recovery volume 130 is applied to the source data 204, the source data, e.g., volume, is restored to the recovery point-in-time.

In an alternative embodiment, the point-in-time data from the log storage 300 may be directly applied to the source data $104_i$ in the source storage 102 without using a recovery point-in-time copy $200_R$ of the source data. However, the advantage of the recovery point-in-time copy $200_R$ is that it allows user to continue to access to the source data $104_i$ while the point-in-time data is being recovered.

Figure 8:
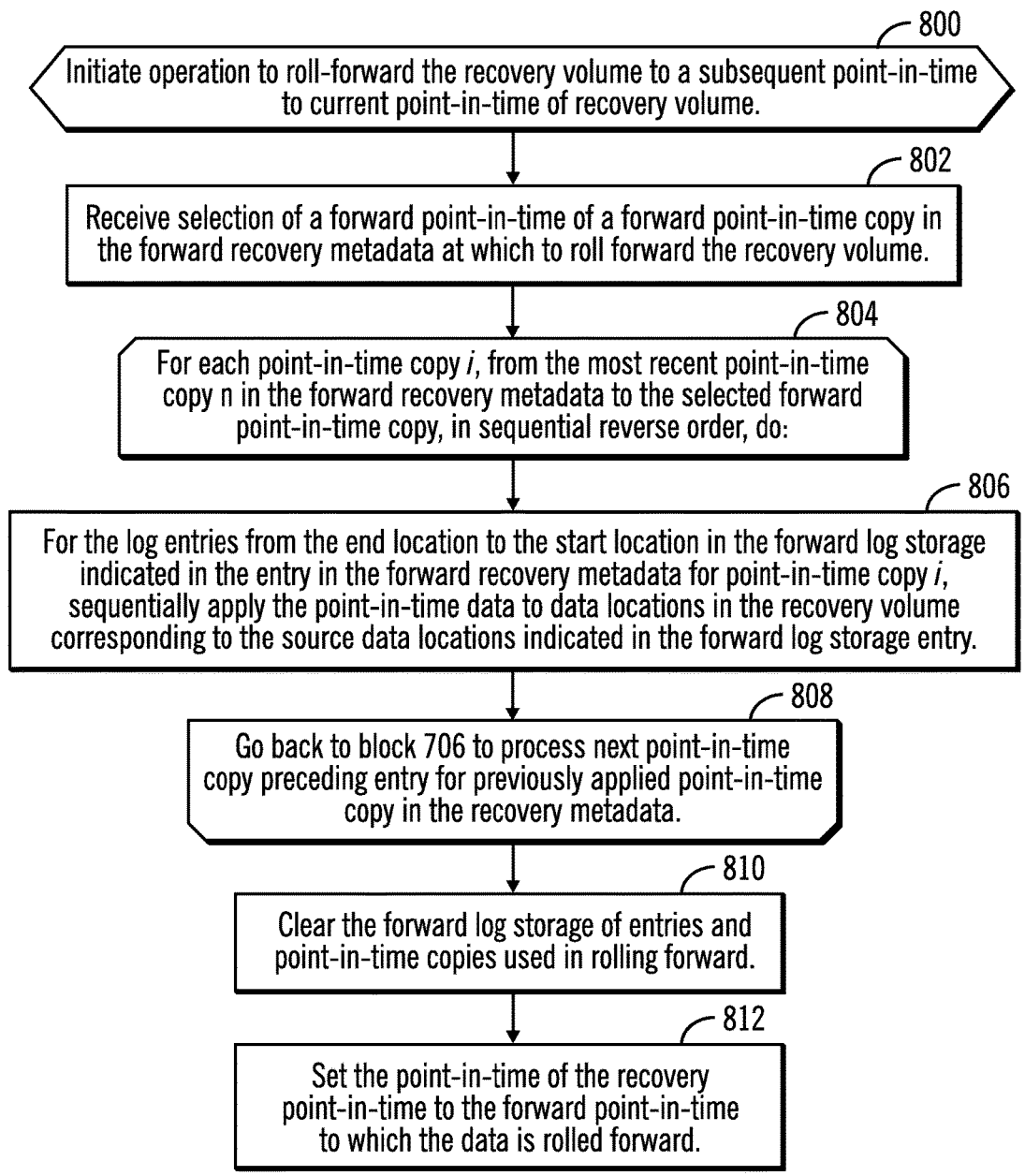
FIG. 8 illustrates an embodiment of operations to roll-forward the source data to a forward point-in-time.

FIG. 8 illustrates an embodiment of operations performed by the recovery manager 122 to roll-forward the recovery volume 130 using the forward log storage $300_F$. Upon initiating (at block 800) an operation to roll-forward the recovery volume 130 to a subsequent point-in-time to current point-in-time of recovery volume 300, the recovery manager 122 receives (at block 804) selection of a forward point-in-time of a forward point-in-time copy in the forward recovery metadata entry $400_i$ in the forward recovery metadata $400_F$ at which to roll forward the recovery volume 130. For each point-in-time copy $200_i$, from the most recent point-in-time copy $200_i$, in the forward recovery metadata $400_i$ to the selected forward point-in-time copy $200_i$, the recovery manager 122, in sequential reverse order, performs the operation at block 806. At block 806, for the log entries $300_i$ from the end location 410 to the start location 408 in the forward log storage $300_F$ indicated in the entry $400_i$ in the forward recovery metadata $400_F$ for the point-in-time copy $200_i$, the recovery manager sequentially applies (at block 806) the point-in-time data to data locations in the recovery volume 130 corresponding to the source data locations indicated in the forward log storage entry $300_i$.

After applying the point-in-time data from the forward log storage $400_F$ to roll the recovery volume 130 forward, the forward log storage $300_F$ may be cleared (at block 810) of entries $300_i$ used in the rolling forward. The point-in-time $208$ of the recovery point-in-time $200_R$ is set (at block 812) to the forward point-in-time to which the data is rolled forward.

Figure 9A:
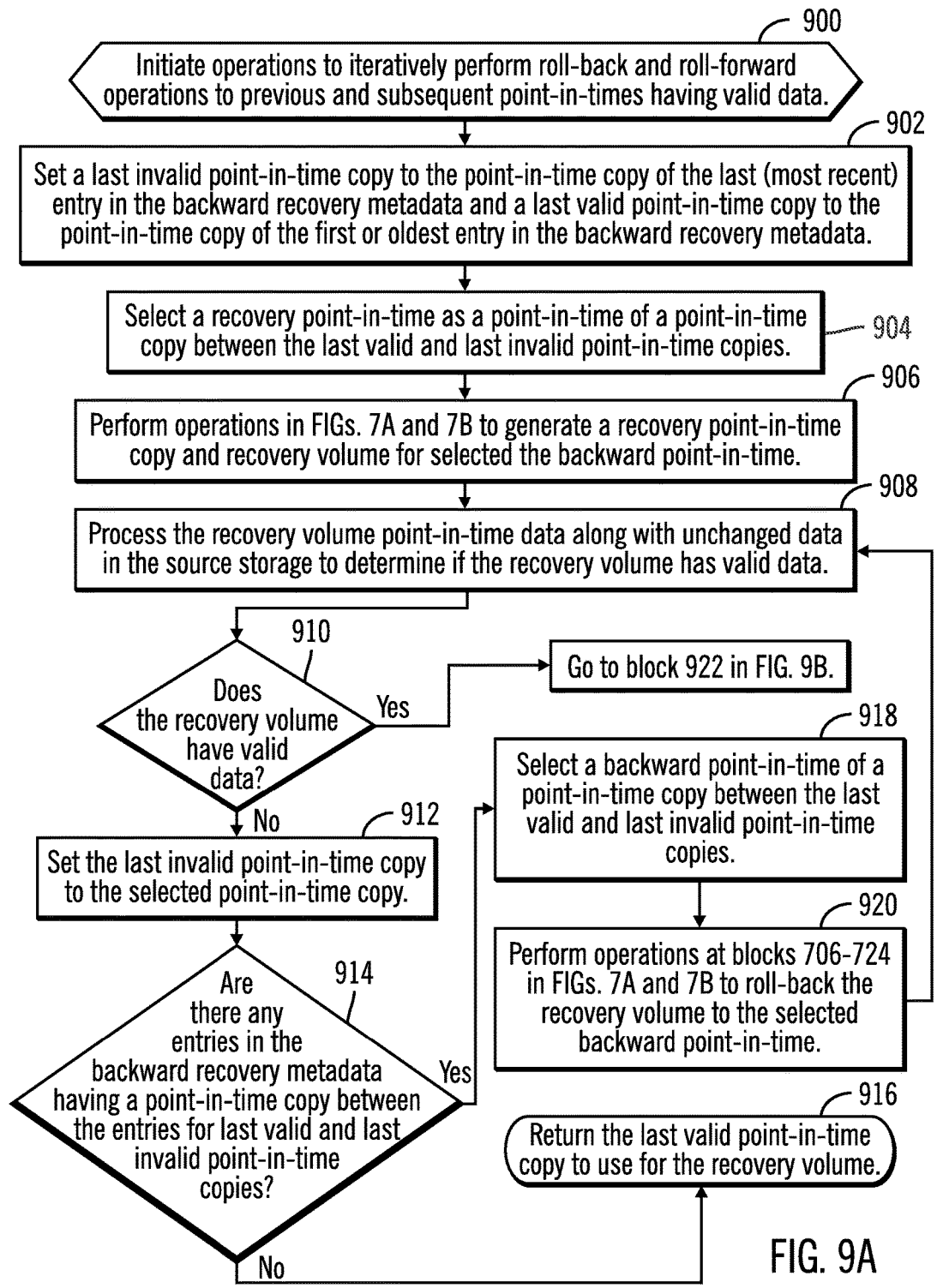
FIGS. 9a and 9b illustrate an embodiment of operations to iteratively perform roll-back and roll-forward operations of source data to a point-in-time having valid data.
Figure 9B:
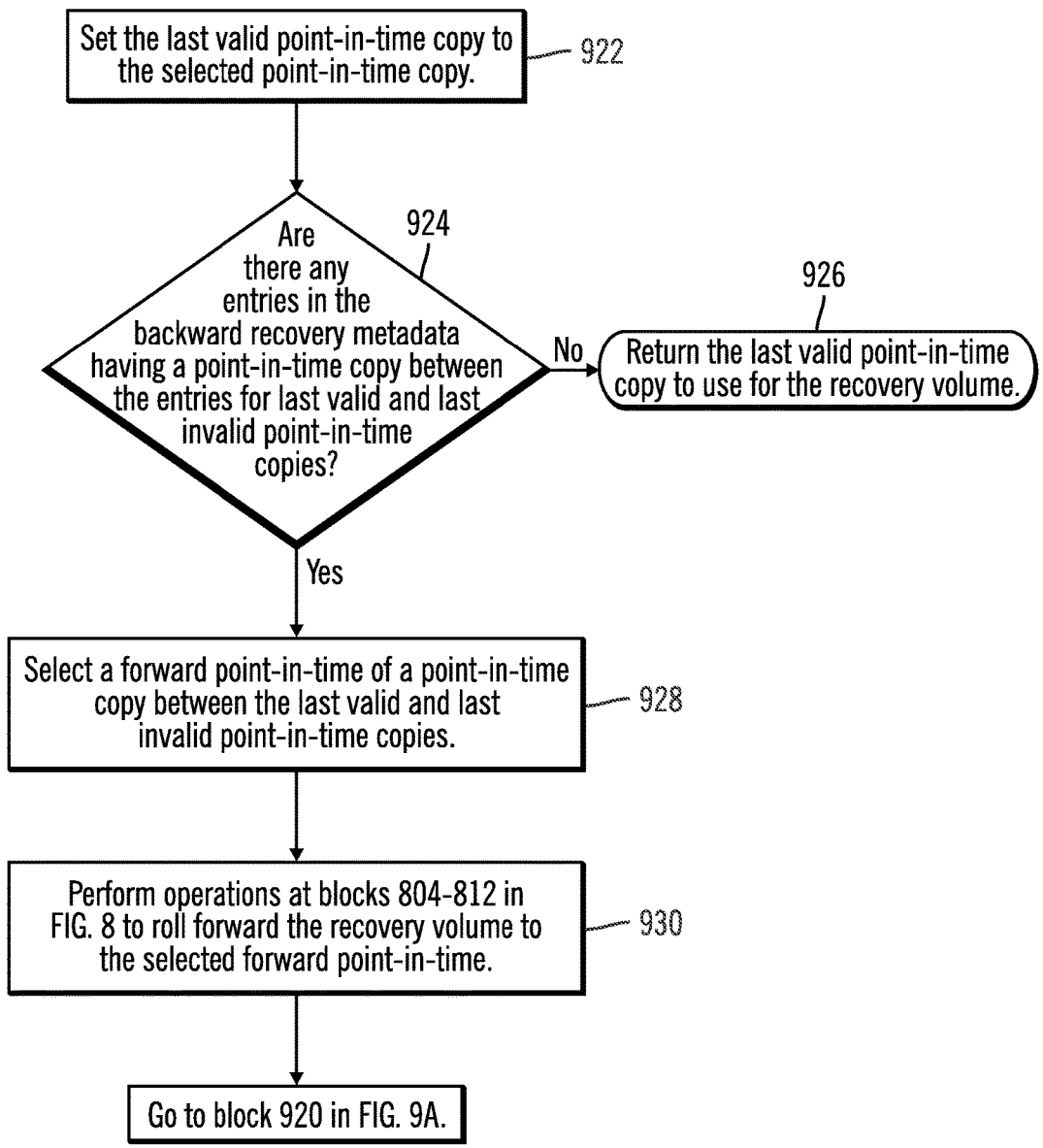

FIGS. 9a and 9b illustrate an embodiment of operations performed by the recovery manager 122 or some other component to iteratively roll the recovery volume 130 forward and backward to different point-in-times to an estimated most current point-in-time at which there is valid in the event the source volume 14 has invalid or corrupt data. Upon initiating (at block 900) operations to iteratively perform roll-back and roll forward operations to a previous or subsequent point-in-time having valid data, the recovery manager 122 sets (at block 902) a last invalid point-in-time copy to the point-in-time copy 404 in the last (most recent) entry $400_N$ in the backward recovery metadata $400_B$ and a last valid point-in-time copy to the point-in-time copy 404 in the first or oldest entry $400_1$ in the backward recovery metadata $400_B$, where there are N entries in the backward recovery metadata $400_B$.

The recovery manager 122 selects (at block 904) a recovery point-in-time as a point-in-time of a point-in-time copy between the last valid and last invalid point-in-time copies. The recovery manager 122 performs (at block 906) the operations in FIGS. 7a and 7b to generate a recovery point-in-time copy $200_R$ and recovery volume 130 for the selected recovery point-in-time. The recovery manager 122 may process (at block 908) the recovery volume 130 point-in-time data along with unchanged data in the source storage 102 to determine if the recovery volume 130 has valid data, or is not corrupt. Error correction and data validation algorithms known in the art may be used to determine whether the recovery volume 130 is valid or corrupt. To perform further iterations to estimate the point-in-time copy having the most current valid data, the recovery manager 122 may perform the operations at block 910 et seq.

If (at block 910) the recovery volume 130 does not have valid data, then the last invalid point-in-time copy is set (at block 912) to the point-in-time copy $200_i$ for the selected recovery point-in-time. The recovery manager 122 determines (at block 914) whether there any entries $400_i$ in the backward recovery metadata $400_B$ having a point-in-time copy 406 between the entries for the last valid and last invalid point-in-time copies. If there are further potential entries to consider, then the recovery manager 122 selects (at block 918) a backward point-in-time of a point-in-time copy $200_i$ between the last valid and last invalid point-in-time copies and performs (at block 920) the operations at blocks 706-724 in FIGS. 7a and 7b to roll back the recovery volume 130 to the selected backward point-in-time, and then back to block 908 to process the recovery volume 130.

If (at block 914) there are no further entries in the backup recovery metadata $400_B$ between the last valid and last invalid point-in0time copies, then the last valid point-in-time copy $200_i$ is returned (at block 916) to use for the recovery volume 130.

If (at block 910) the recovery volume 130 has valid data, then control proceeds to block 922 in FIG. 9b to perform a roll-forward operation. At block 922, the last valid point-in-time copy is set to the selected point-in-time copy. If (at block 924) there any entries $400_i$ in the forward recovery metadata $400_F$ having a point-in-time copy 406 between the entries for the last valid and last invalid point-in-time copies, then the recovery manager 122 selects (at block 928) a forward point-in-time of a point-in-time copy $200_i$ between the last valid and last invalid point-in-time copies and performs (at block 930) the operations at blocks 804-812 in FIG. 8 to roll forward the recovery volume 130 to the selected forward point-in-time, and then back to block 910 in FIG. 9a to further process the recovery volume 130. If (at block 924) there are no further entries in the forward recovery metadata $400_B$ between the last valid and last invalid point-in-time copies, then the last valid point-in-time copy $200_i$ is returned (at block 916) to use for the recovery volume 130. The final recovery volume 130 may be applied to the source data, e.g., volume $104_i$, to return to the point-in-time of the final recovery volume 130 comprising a most recent time at which the source data had valid data.

With the operations of FIGS. 9a and 9b, the recovery volume may be rolled backward and forward iteratively to determine a point-in-time copy for a most current point-in-time having valid data. In alternative embodiments, other operations may be used to estimate the most current point-in-time copy having valid data, such as performing the iterative operations of FIGS. 9a and 9b for a limited number of times before selecting the last valid point-on-time copy to use for the roll-back operation. Alternatively, other selection techniques may be used to select one of the point-in-time copies to use to roll-back the source storage 102 to a point where there is valid data.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
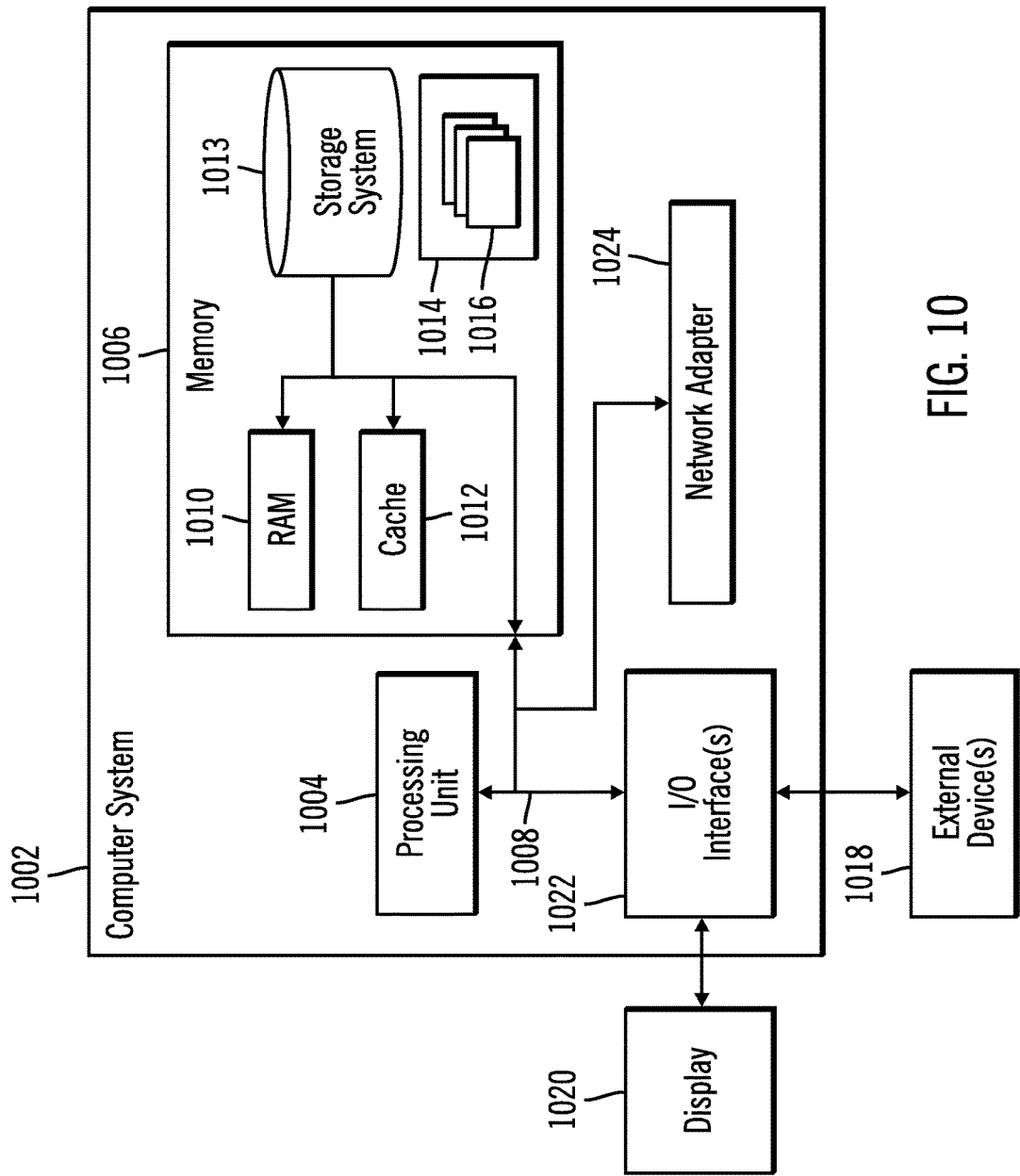
FIG. 10 illustrates a computing environment in which the components of FIG. 1 may be implemented.

The computational components of FIG. 1, including the storage controller 100 and host 106 may be implemented in one or more computer systems, such as the computer system 1002 shown in FIG. 10. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer 1002 may be implemented as program modules 1016 which generally carry out the functions and/or methodologies of embodiments of the invention as described herein. The systems of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing point-in-time copies of a source storage, wherein the computer program product comprises a computer readable storage medium having program instructions embodied therewith, the program instructions executable by a processor to cause operations, the operations comprising:

establishing a plurality of point-in-time copies of source data in a source storage at different point-in-times;

in response to receiving writes to the source data after establishing the point-in-time copies, copying point-in-time data of the source data, before being updated by the received writes, to a backward log storage, wherein the backward log storage stores point-in-time data for multiple of the point-in-time copies; and applying the point-in-time data in the backward log storage to a recovery source data to roll-back the source data to a backward point-in-time of one of the point-in-time copies;

before applying the point-in-time data from the backward log storage, copying point-in-time data in the recovery source data, to be updated by the point-in-time data from the backward log storage, to a forward log storage; and applying the point-in-time data in the forward log storage to the recovery source data to roll forward the recovery source data to a forward point-in-time subsequent to the backward point-in-time.

2. The computer program product of claim 1, wherein for each instance of the point-in-time data copied to the backward log storage, generating metadata indicating a source data location in the source data from which the point-in-time data was copied, wherein the applying the backward log storage to roll-back the source data comprises copying the point-in-time data from the backward log storage to the source data location in the recovery source data indicated in metadata, and wherein, for each instance of the point-in-time data copied to the forward log storage, metadata is provided indicating a source data location in the source data from which the point-in-time data was copied, wherein the applying the forward log storage to roll-forward the recovery source data comprises copying the point-in-time data from the forward log storage to the source data location in the recovery source data indicated in metadata.

3. The computer program product of claim 1, wherein the point-in-time data is written to the backward log storage at sequential data locations in an order in which the point-in-time data was updated at the source data, wherein the applying the backward log storage to roll-back the recovery source data comprises applying the point-in-time data from a most recent written location in the backward log storage, backward through sequential locations through a selected backward point-in-time copy prior to a current point-in-time of the source data, wherein the point-in-time data is written to the forward log storage at sequential data locations in an order in which the point-in-time data was rolled back at the recovery source data.

4. The computer program product of claim 3, wherein the applying the forward log storage to roll-forward the recovery source data comprises applying the point-in-time data from a most recent written location in the forward log storage sequentially through sequential locations having point-in-time data for a selected forward point-in-time copy following the selected backward point-in-time copy to roll forward the recovery source data to a forward point-in-time of the selected forward point-in-time copy.

5. The computer program product of claim 1, wherein the operations further comprise:
for each point-in-time copy of the established point-in-time copies, including in backward recovery metadata an entry including a first location and a last location in the backward log storage having point-in-time data for the point-in-time copy, wherein the applying the backward log storage to roll-back the source data comprises copying the point-in-time data to the recovery source data from the first location through the last location in the backward log storage indicated in the entry in the backward recovery metadata for each point-in-time copy used to roll-back the source data in the recovery source data.

6. The computer program product of claim 5, wherein the operations further comprise:
including an entry in forward recovery metadata including a first location and a last location in the forward log storage having point-in-time data for the point-in-time copy subject to a roll-back, wherein the applying the forward log storage to roll-forward the recovery source data comprises copying the point-in-time data to the recovery source data from the first location through the last location in the forward log storage indicated in the entry in the forward recovery metadata for each point-in-time copy used to roll-forward the recovery source data.

7. The computer program product of claim 1, wherein the operations further comprise:

creating a recovery point-in-time copy of the source data to the recovery source data.

8. The computer program product of claim 7, wherein the operations further comprise:
indicating, in a change recording data structure for the recovery point-in-time copy, that data locations in the recovery source data to which the point-in-time data in the backward log storage was applied have been updated.

9. The computer program product of claim 1, wherein the operations further comprise:
determining whether the recovery source data is valid after copying the point-in-time data in the backward log storage from all the point-in-time copies used in the roll-back of the source data, wherein the applying the point-in-time data from the forward log storage is performed in response to determining that the recovery source data has valid data.

10. The computer program product of claim 9, wherein the operations further comprise:
performing an additional iteration of the applying the point-in-time data in the backward log storage to further roll back the recovery source data to a further selected backward point-in-time earlier in time than a last used backward point-in-time resulting in the determination that the recovery source data is not valid.

11. The computer program product of claim 9, wherein the operations further comprise:
determining whether the recovery source data is valid after copying the point-in-time data in the forward log storage from all the point-in-time copies used roll-forward the recovery source data; and
performing an additional iteration of the applying the point-in-time data in the forward log storage to further roll forward the recovery source data to a further selected forward point-in-time later in time than a last used forward point-in-time resulting in the determination that the recovery source data is valid.

12. The computer program product of claim 1, wherein the operations further comprise:
iteratively applying point-in-time data from the backward log storage and the forward log storage to roll the recovery source data to at least one backward point-in-time and at least one forward point-in-time, respectively, until determining a final recovery source data having valid data; and
applying the point-in-time data from the final recovery source data to the source data to return the source data to a point-in-time prior to a current point-in-time at which the source data has invalid data.

13. A system for managing point-in-time copies of a source storage, comprising:
a processor; and
a computer readable storage medium having program instructions embodied therewith, the program instructions executable by the processor to cause operations, the operations comprising:
establishing a plurality of point-in-time copies of source data in a source storage at different point-in-times;
in response to receiving writes to the source data after establishing the point-in-time copies, copying point-in-time data of the source data, before being updated by the received writes, to a backward log storage, wherein the backward log storage stores point-in-time data for multiple of the point-in-time copies; and applying the point-in-time data in the backward log storage to a recovery source data to roll-back the source data to a backward point-in-time of one of the point-in-time copies;

before applying the point-in-time data from the backward log storage, copying point-in-time data in the recovery source data, to be updated by the point-in-time data from the backward log storage, to a forward log storage; and applying the point-in-time data in the forward log storage to the recovery source data to roll forward the recovery source data to a forward point-in-time subsequent to the backward point-in-time.

14. The system of claim 13, wherein for each instance of the point-in-time data copied to the backward log storage, generating metadata indicating a source data location in the source data from which the point-in-time data was copied, wherein the applying the backward log storage to roll-back the source data comprises copying the point-in-time data from the backward log storage to the source data location in the recovery source data indicated in metadata, and wherein, for each instance of the point-in-time data copied to the forward log storage, metadata is provided indicating a source data location in the source data from which the point-in-time data was copied, wherein the applying the forward log storage to roll-forward the recovery source data comprises copying the point-in-time data from the forward log storage to the source data location in the recovery source data indicated in metadata.

15. The system of claim 13, wherein the operations further comprise:

for each pont-in-time copy of the established point-in-time copies, including in backward recovery metadata an entry including a first location and a last location in the backward log storage having point-in-time data for the point-in-time copy, wherein the applying the backward log storage to roll-back the source data comprises copying the point-in-time data to the recovery source data from the first location through the last location in the backward log storage indicated in the entry in the backward recovery metadata for each point-in-time copy used to roll-back the source data in the recovery source data.

16. The system of claim 13, wherein the operations further comprise:

determining whether the recovery source data is valid after copying the point-in-time data in the backward log storage from all the point-in-time copies used in the roll-back of the source data, wherein the applying the point-in-time data from the forward log storage is performed in response to determining that the recovery source data has valid data.

17. The system of claim 16, wherein the operations further comprise:

performing an additional iteration of the applying the point-in-time data in the backward log storage to further roll back the recovery source data to a further selected backward point-in-time earlier in time than a last used backward point-in-time resulting in the determination that the recovery source data is not valid.

18. The system of claim 16, wherein the operations further comprise:

determining whether the recovery source data is valid after copying the point-in-time data in the forward log storage from all the point-in-time copies used to roll-forward the recovery source data; and performing an additional iteration of the applying the point-in-time data in the forward log storage to further roll forward the recovery source data to a further selected forward point-in-time later in time than a last used forward point-in-time resulting in the determination that the recovery source data is valid.

19. A method for managing point-in-time copies of a source storage, comprising:

establishing a plurality of point-in-time copies of source data in a source storage at different point-in-times;

in response to receiving writes to the source data after establishing the point-in-time copies, copying point-in-time data of the source data, before being updated by the received writes, to a backward log storage, wherein the backward log storage stores point-in-time data for multiple of the point-in-time copies; and applying the point-in-time data in the backward log storage to a recovery source data to roll-back the source data to a backward point-in-time of one of the point-in-time copies;

before applying the point-in-time data from the backward log storage, copying point-in-time data in the recovery source data, to be updated by the point-in-time data from the backward log storage, to a forward log storage; and applying the point-in-time data in the forward log storage to the recovery source data to roll forward the recovery source data to a forward point-in-time subsequent to the backward point-in-time.

20. The method of claim 19, wherein for each instance of the point-in-time data copied to the backward log storage, generating metadata indicating a source data location in the source data from which the point-in-time data was copied, wherein the applying the backward log storage to roll-back the source data comprises copying the point-in-time data from the backward log storage to the source data location in the recovery source data indicated in metadata, and wherein, for each instance of the point-in-time data copied to the forward log storage, metadata is provided indicating a source data location in the source data from which the point-in-time data was copied, wherein the applying the forward log storage to roll-forward the recovery source data comprises copying the point-in-time data from the forward log storage to the source data location in the recovery source data indicated in metadata.

21. The method of claim 19, further comprising:

for each point-in-time copy of the established point-in-time copies, including in backward recovery metadata an entry including a first location and a last location in the backward log storage having point-in-time data for the point-in-time copy, wherein the applying the backward log storage to roll-back the source data comprises copying the point-in-time data to the recovery source data from the first location through the last location in the backward log storage indicated in the entry in the backward recovery metadata for each point-in-time copy used to roll-back the source data in the recovery source data.

22. The method of claim 19, further comprising:

determining whether the recovery source data is valid after copying the point-in-time data in the backward log storage from all the point-in-time copies used in the roll-back of the source data, wherein the applying the point-in-time data from the forward log storage is performed in response to determining that the recovery source data has valid data.

23. The method of claim 22, further comprising:
performing an additional iteration of the applying the point-in-time data in the backward log storage to further roll back the recovery source data to a further selected backward point-in-time earlier in time than a last used backward point-in-time resulting in the determination that the recovery source data is not valid.

24. The method of claim 22, further comprising:
determining whether the recovery source data is valid after copying the point-in-time data in the forward log storage from all the point-in-time copies used to roll-forward the recovery source data; and
performing an additional iteration of the applying the point-in-time data in the forward log storage to further roll forward the recovery source data to a further selected forward point-in-time later in time than a last used forward point-in-time resulting in the determination that the recovery source data is valid.

* * * * *